Figure 1:
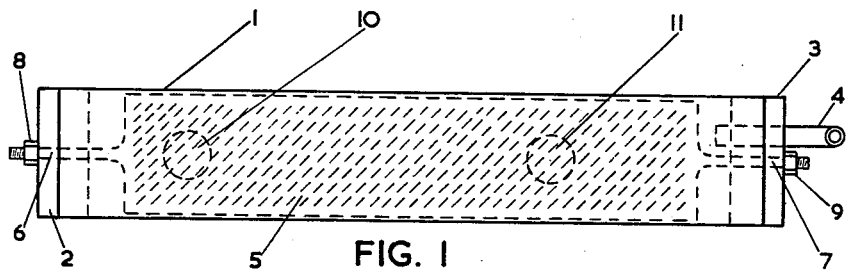

Nov. 13, 1962     P. D. COPPOCK     3,063,689
GAS/LIQUID CONTACTING MEANS

Filed June 5, 1958     3 Sheets-Sheet 1

Philip Dalton COPPOCK
INVENTOR

By:
Wenderoth, Lind & Ponack
Attys

Nov. 13, 1962 P. D. COPPOCK 3,063,689
GAS/LIQUID CONTACTING MEANS
Filed June 5, 1958 3 Sheets-Sheet 2

Philip Dalton COPPOCK
INVENTOR
By: Wenderoth, Lind & Ponack
Attys

United States Patent Office 3,063,689
Patented Nov. 13, 1962

3,063,689
GAS/LIQUID CONTACTING MEANS
Philip Dalton Coppock, Epsom, England, assignor to The Distillers Company Limited, Edinburgh, Scotland, a British company
Filed June 5, 1958, Ser. No. 740,085
Claims priority, application Great Britain Oct. 2, 1957
11 Claims. (Cl. 261—124)

This invention relates to a disperser for contacting liquids and gases, the gases being released into the liquid in a finely divided form, and in particular to the aeration of liquids containing suspended solids, as for example, the aeration of sewage liquids before discharge from the sewage disposal works.

It is common practice in modern sewage disposal processes to aerate primary effluents containing a considerable amount of suspended solids, in order to reduce the amount of oxygen required for its complete oxidation when subsequently discharged from the sewage disposal works, for example into a river or into the sea. This is an essential step since the Biological Oxygen Demand, that is the amount of oxygen required to oxidise a given amount of the sewage discharge, must generally by statute, be carefully controlled.

In order to achieve adequate aeration of the very large volume of liquid suspensions with which large modern sewage works must deal, it is usual to allow such liquid to flow through channels, which may, for example, be of some 200 to 300 feet in length, 15 to 20 feet in width and possibly carrying a liquid to a depth of 10 to 12 feet. As the liquid flows through such channels, air in a finely divided form, is introduced from a number of points in the base of these channels and passes upwards through the flowing suspensions oxidising the organic matter therein as it passes.

It has previously been common practice to introduce air into the sewage through a large number of sintered porous structures on the floor of the channel through which the sewage passes. The sintered porous structures may be tiles suitably arranged on the floor of the channel, for example in the base of a series of shallow parallel troughs. The troughs may suitably be about 6 inches wide and some 3 inches deep and may be separated from each other by ridges of conical cross section. Alternatively the sintered porous structures may be of tubular form. In each case the sintered porous structures are in communication with a pipe for the supply of air.

While the aeration achieved by such arrangements is adequate there are disadvantages in the use of such structures for the purpose of air introduction since their perforations may be blocked either by the growth of organisms or by the passage of dirty air, for example containing solid particles. This blocking is accelerated in the case of failure of the air supply and cannot always be cured by restoring the air supply since the finely divided particles may penetrate the pores of the structure. Consequently, in order to restore an efficient aeration, the structures may require removal, scrubbing and, in some cases chemical treatment or firing to destroy organic matter, before replacement. Furthermore, in order to remove such structures for the purpose it may first be necessary to drain the channels, thus causing considerable disruption of the sewage purification process.

It is an object of the present invention to provide a means for contacting liquids with gases in a finely divided form, which means does not become blocked by solid particles which may be present in the liquid or gas.

Accordingly, the present invention is a disperser for contacting a liquid phase with a finely divided gas comprising an elongated chamber of resilient material having an inlet for the gas and as outlet for the gas perforations formed in the wall of the chamber substantially without the removal of material, and a supporting member within the elongated chamber comprising a rigid elongated member having a cross section the dimensions of which at right angles to each other are different, one dimension being greater than the normal internal width of the chamber along that dimension, but less than one half the length of the internal periphery of the chamber, the circumference of the member being less than the internal periphery of the chamber.

The chamber preferably consists of a tubular structure of resilient material, for example natural or synthetic rubber such as chloroprene, neoprene or silicone rubber, or reinforced rubber, having walls of sufficient thickness to withstand the pressure at which it operates, suitably between about $\frac{1}{16}''$ and $\frac{3}{32}''$, and being sealed at least at one end by an imperforate rigid end wall, preferably of oval cross section. The other end may be provided with a similar seal and with an inlet pipe or, alternatively, the chamber may be sealed by an imperforate wall at both ends and the inlet pipe inserted at some point along the length of the chamber.

The chamber may be of any required length to serve a particular purpose but for convenience in use, it has been found that if very long distances are to be traversed, for example of the order of 200 to 300 feet, the distance may be more easily covered by a number of smaller units, for example having a chamber length of the order of about 10 to 20 feet.

The walls of the chamber may be made from any suitable resilient material as previously noted providing that such materials have the desired property when suitably perforated, of responding to fluid pressures in such a manner as to allow the lips of the perforation to open outwardly, that is towards the opposite side of the material to which the greater pressure is being applied, and to regain their original position once the pressure has been released or the pressure on each side equalised. It is preferred to use a rubber chamber of either natural or synthetic rubber in the present invention, suitably in the form of a rubber tube of the desired dimensions.

The perforations in the said chamber are formed without removal of any appreciable amount of material from the chamber wall, to achieve the desired object, that is, such perforations are made by a puncturing means such as a needle rather than by a drilling means which tends to remove some of the materials. For example, where rubber is used as the chamber material this may be perforated by a needle suitably operated by a sewing machine. While the needle may be of any cross section, it has been found most effective to use a needle of elongated cross section and preferably having a chisel-shaped end, thus forming a slit in the material. If desired, the slits may be so formed as to intersect each other, for example to form an X, Y or V shape. In forming such perforations, it has been found convenient to avoid placing when longitudinally end to end since this tends to weaken the material. When single slits are formed they may suitably be made at an angle to the longitudinal axis for example at about 45° as shown in the accompanying drawings.

The purpose of forming the perforations without removal of the material is to produce self-sealing perforations. Should particles become lodged in such perforations, the pressure will increase when large numbers are blocked and the lips of such perforations will distend increasingly until the particle is released. Futhermore, when the gas is no longer passing through such perforations, the lips will close and particles will not therefore readily enter the perforations and pass into the interior of the chamber.

It has been found that when bubbles of gas issue from perforations in the lower half of the chamber, such bubbles tend to rise up the lower surface of the chamber and in the process, coalesce. Accordingly, it is preferred to form perforations only on the upper surface of the chamber when the device is in use, although in some cases there may be a small number of perforations on the side or lower surface to allow the escape of liquid which has accumulated within the chamber, if desired.

The supporting member is preferably of rectangular or oval cross section and of the same length, at least, as the perforated portion of the chamber. It may, however, be of any suitable cross section providing it complies with the requirements given in the claims. It may be made from metal such as brass, aluminium and its alloys, copper, stainless steel or iron or steel which has been protectively coated or other material such as laminated plastic material, which has sufficient mechanical strength to support the chamber and which is resistant to substances present in the chamber during operation. The member may be solid or hollow in cross section as desired and may have holes drilled through the smaller dimension to facilitate the passage of air or other gas from one side of the member to the other, when the member is in position. It is preferred that the supporting member shall be of sufficient weight to retain the disperser on the floor of the channel without being secured by bolts, etc., thus facilitating removal when required.

It is necessary that the member shall be of different dimensions at right angles to each other in cross section, the greater dimension being greater than that of the normal internal diameter of the chamber but less than that of half the internal periphery of the chamber, the circumference of the member being less than the internal periphery of the chamber. By the use of a supporting member of these dimensions the chamber wall is so deflected that its diameter is lengthened in one plane but not in the plane at right angles to this when the supporting member is inserted, and it is thus ensured that the perforations are not so stretched as to remain permanently opened.

It has been found that by the use of a supporting member of the form described a considerable advantage is obtained. For example, the insertion of such a supporting member, while not distending the shape of the slits and affecting their self-sealing function, results in a reduced pressure drop across the disperser when compared with a similar tubular disperser without an internal supporting member shaped according to the present invention. This is clearly shown in the example at the end of this specification.

By use of such dispersers it may be possible to use pumps to supply air or similar gases which operate at a lower pressure than that required by dispersers not having an internal supporting member, for example, it may be possible to use rotary pumps rather than piston pumps; the former being more economical to install and operate.

Furthermore the effective area of the disperser is increased by the insertion of such a supporting member. When a tubular disperser is used without a distending internal supporting member the bubbles rising from the part of the surface of the disperser which forms an angle approaching a right angle with the surface of the liquid tend to coalesce and to rise through the liquid as a reduced number of larger bubbles, thereby decreasing the efficiency of contact. In the dispersers according to the present invention much less of the perforated surface forms such an angle with the surface of the liquid and thus the liquid is contacted with the gas phase with increased efficiency.

The supporting member is preferably inserted into the chamber in such a position that the majority of the bubbles pass through the perforations in the chamber wall when the disperser is in use substantially at right angles to the plane of the greater dimension of the supporting member. The perforated area of the chamber wall is placed uppermost in the liquid to be contacted with the gas phase.

The chamber is conveniently sealed by rigid end pieces of similar cross section to that taken up by the disperser when in use, for example of oval or rectangular section, and the supporting member fixed in position by means of nuts and bolts passing from the supporting member and through the end pieces. By this means the supporting member is prevented from rotating within the chamber during use.

By the term "normal internal width" of the tubular elastic chamber is meant the internal width when the chamber is deflected by insertion of the supporting member. It is thus substantially without tension applied to the walls, either by excessive pressure or by mechanical distortion.

It is preferred that the normal cross section of the chamber before insertion of the supporting member shall be circular but chambers having other normal cross sectional shapes may be used, if desired.

Figure 2:
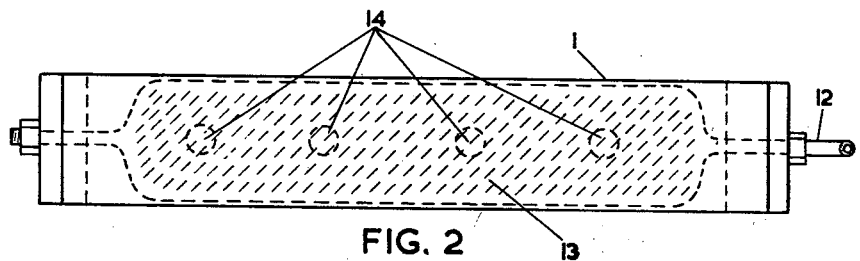
Figure 3:
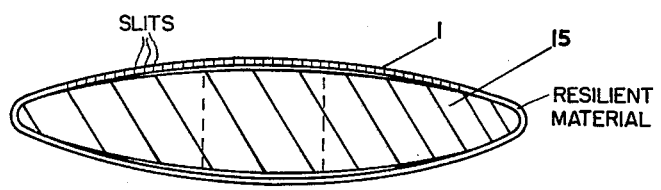
Figure 4:
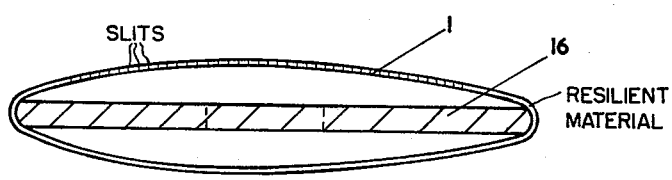

The accompanying drawings show presently-preferred representative embodiments of the present invention. FIGURE 1 shows a plan view of a disperser according to the present invention having perforations in the upper surface, FIGURE 2 shows a similar view of a disperser in which the inlet for the gas phase leads into the supporting member, FIGURE 3 shows a cross section through a disperser having a supporting member of oval cross section and FIGURE 4 shows a cross section of a disperser having a rectangular supporting member.

Figure 5:
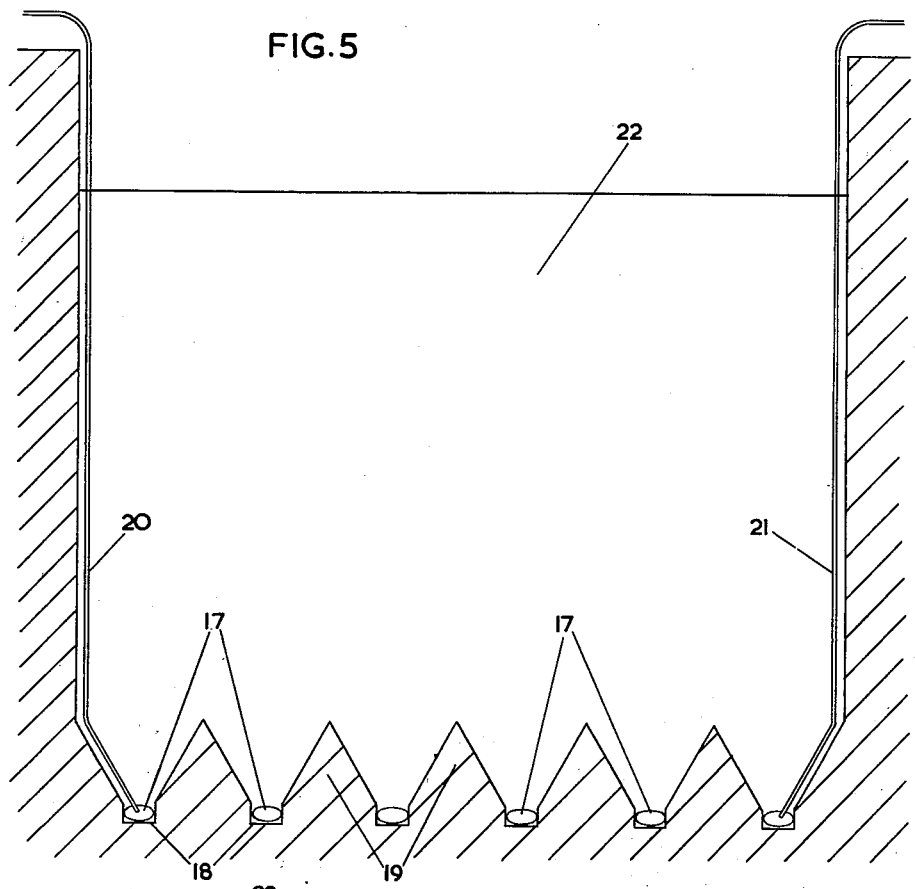
Figure 6:
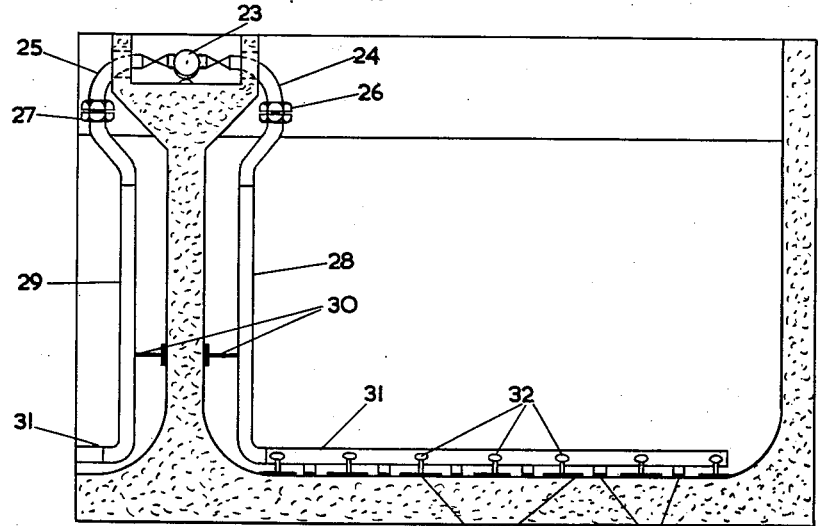
Figure 7:
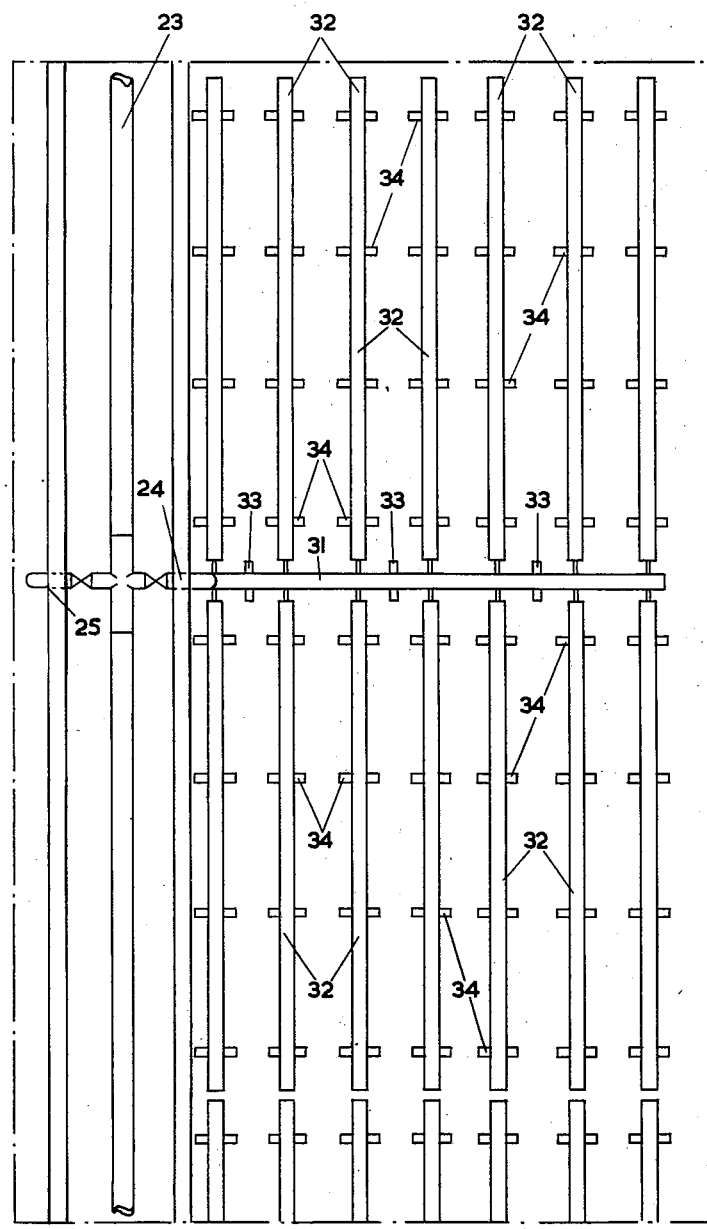

FIGURE 5 shows the dispersers according to the present invention in position in one type of sewage channel which was designed to contain porous sintered tiles in the bottom of the channels in which the dispersers are now resting. FIGURES 6 and 7 show a suitable arrangement of dispersers in another type of sewage channel in which a large number of dispersers are connected to a single air supply pipe. The dispersers shown in the latter figures may replace tubular sintered porous dispersers which were similarly connected to the air pipe in previously used structures.

By utilising existing equipment the cost of installing dispersers according to the present invention is considerably reduced.

In FIGURE 1 the tubular rubber chamber 1 of length about 10 feet, diameter 2½" and wall thickness about 1/16" is supported at each end by end pieces 2 and 3, end piece 3 carrying an inlet tube 4. Perforations in the chamber comprise parallel lines of slits, each line being 5 mm. apart and each perforation being 4 mm. distant from the next and making an angle 45° with the long axis of the chamber. The solid supporting member 5 of galvanised iron is affixed by means of threaded portions 6 and 7 and nuts 8 and 9 to the end pieces. Holes 10 and 11 are provided through the supporting member.

In FIGURE 2 the inlet tube 12 is part of the hollow supporting member 13 and leads the gas phase into the interior of the supporting member from which it escapes through holes 14 into elaastic walled chamber 1.

The chamber 1 of resilient material in FIGURE 3 surrounds the solid supporting member 15 of oval cross section and in FIGURE 4 a similar chamber 1 surrounds a solid supporting member 16 of rectangular cross section.

In FIGURE 5 the disperser 17 of the type and dimensions described in FIGURE 1 are laid in the bottom of channel 18 between conical projections 19 and air supply pipes 20 and 21 from the dispersers are connected to the air supply. Each disperser is provided with an air pipe but only two are shown in the drawing. Air is passed down the supply pipes to the dispersers and escapes therefrom through the perforations in the upper surface of the disperser and oxidises organic matter in the sewage 22. The air rises to the surface of the liquid in a finely divided state.

In FIGURE 6 there is shown a central air supply pipe 23 to which is connected branch pipes 24 and 25 terminating in joints 26 and 27. To these joints are connected descending air supply pipes 28 and 29 by means of unions which may be disconnected when it is desired to remove the dispersers from the sewage. The descending air supply pipes are provided with supports 30 to maintain them at a suitable distance from the wall of the channel.

The lower ends of pipes 28 and 29 are connected to side pipes 31 from which branch disperser 32 of the present invention of the type and dimensions described in FIGURE 1 on each side of pipes 31. The side pipes are provided with supports 33 which rest upon the floor of the channel as are the dispersers by supports 34.

In FIGURE 7 there is shown a plan view of the device illustrated in FIGURE 6.

The following example shows the reduction in pressure drop across the walls of the disperser provided by a disperser according to the present invention when compared with an identical disperser without the internal supporting member.

EXAMPLE

Three rubber tubes of 2½" normal internal diameter having walls of 1/16" thick and of 18" in length were taken and a central portion 10" in length was perforated by a needle of 0.095" in diameter and having a tapered chisel end as described below.

*Tube A.*—Perforations were made along a line parallel to the long axis of the tube each perforation being 4 mm. apart. A second line of perforations were then prepared at a distance of 5 mm. from the first. This was repeated until 17 lines of perforations had been formed.

*Tube B.*—The perforation of the tube was similar but the perforations were formed at an angle of 20° to the long axis of the tube.

*Tube C.*—This was prepared as in A and B but the perforations were formed at an angle of 45° to the long axis of the tube.

One end of the tube was sealed by an oval end piece and a similar end piece having an inlet was placed in the other end and connected to an air supply. The tube was then sunk in water to a depth of 19 cms. and air supplied at a series of calibrated rates during which time the pressure drop across the dispenser was noted.

The tubes were then withdrawn from the water and a supporting member 14" long and 3¼" wide was inserted, this being fixed in position by means of threaded ends passing through the end pieces upon which were tightened nuts. The supporting member was positioned so that the perforations were all above the member and the tubes were then sunk in water to the same depth as before and similar tests carried out.

The results are given in the table below.

The results were obtained at the following air rates— 0.25, 0.50, 1.0, 2.0, 3.0, 4.0 cu. ft. per minute per foot run of perforated disperser.

TABLE

*Pressure Drop: (Pounds Per Square Inch Gauge)*

| | With internal supporting member | Without internal supporting member |
|---|---|---|
| Tube A | 0.19 | 0.24 |
| | 0.20 | 0.25 |
| | 0.22 | 0.26 |
| | 0.25 | 0.34 |
| | 0.27 | 0.42 |
| | 0.29 | 0.45 |
| Tube B | 0.21 | 0.33 |
| | 0.22 | 0.37 |
| | 0.24 | 0.42 |
| | 0.27 | 0.50 |
| | 0.29 | 0.56 |
| | 0.31 | 0.60 |
| Tube C | 0.24 | 0.43 |
| | 0.26 | 0.47 |
| | 0.26 | 0.49 |
| | 0.29 | 0.62 |
| | 0.31 | 0.68 |
| | 0.32 | 0.69 |

I claim:

1. A disperser for contacting a liquid with a finely divided gas, comprising an elongated hollow body of resilient material being provided with self-sealing perforations formed in the wall of said body substantially without the removal of material therefrom in at least one effective zone extending longitudinally over the surface of said body and destined for the passage of gas therethrough, inlet means for introducing the gas into the interior of said hollow body, and a supporting member the cross section of which, normal to the longitudinal axis of said hollow body, has a sole maximum and a sole minimum diameter, taken at right angles to each other, the maximum one of said diameters being greater than the maximum internal width of said body but less than one-half the length of the internal periphery of the cross section of said body prior to insertion of said supporting member, the circumference of the cross section of said supporting member being less than said internal periphery of said body cross section, said supporting member being mounted inside said hollow body in such a manner that the marginal portions of said member corresponding to said maximum diameter are in contact with opposite sides of the inner wall of said hollow body in zones thereof parallel to said effective zone, thereby maintaining said body deflected in a direction at right angles to said longitudinal axis of said body and in substantially untensioned condition, thereby maintaining said effective zone out of contact with the surface of said supporting member.

2. A disperser as claimed in claim 1 wherein the perforations are in the form of slits formed at an angle of at least 20° to the longitudinal axis of said hollow body.

3. A disperser as claimed in claim 1 wherein the perforations are slits formed at an angle of substantially 45° to the longitudinal axis of said hollow body.

4. A disperser as claimed in claim 1 wherein the supporting member is of oval cross section.

5. A disperser as claimed in claim 1 wherein the supporting member is rectangular in cross section.

6. A disperser as claimed in claim 1 wherein the supporting member is hollow, said inlet means being connected to the interior of the supporting member, the supporting member having holes through its walls.

7. A disperser as claimed in claim 1 wherein the perforations in the wall of said hollow body are formed in half of the surface area of said hollow body.

8. A disperser as claimed in claim 1 wherein said hollow body is provided with end pieces of oval cross section.

9. A disperser as claimed in claim 1 wherein the hollow body is provided with end pieces to which said supporting member is rigidly secured.

10. A disperser according to claim 1 wherein the resilient material is rubber.

11. A disperser as described in claim 1 wherein said zone having said perforations extends substantially between and parallel to the wall portions of said hollow body contacted by said portions of said member opposite one face of the latter.

References Cited in the file of this patent

UNITED STATES PATENTS

| 1,245,985 | Saunders | Nov. 6, 1917 |
| 1,343,123 | Gahl et al. | June 8, 1920 |
| 1,681,890 | Washburn | Aug. 21, 1928 |
| 1,717,713 | Logan | June 18, 1929 |
| 1,873,843 | MacDonald | Aug. 23, 1932 |
| 2,555,201 | Nordell | May 29, 1951 |
| 2,815,943 | Lamb | Dec. 10, 1957 |

FOREIGN PATENTS

| 117,459 | Austria | Apr. 25, 1930 |
| 507,621 | Germany | Sept. 18, 1930 |
| 715,650 | Great Britain | Sept. 15, 1954 |